United States Patent Office 3,349,125
Patented Oct. 24, 1967

3,349,125
AROMATIC SULFONYL BIS-UREAS AND
PROCESS OF PREPARATION
Rudi F. W. Rätz and Philip M. Pivawer, Hamden, Conn., assignors to Olin Mathieson Chemical Corporation, New Haven, Conn., a corporation of Virginia
No Drawing. Filed Nov. 26, 1965, Ser. No. 510,043
9 Claims. (Cl. 260—553)

This invention relates to selected 3,3'-diaryl-1(trihalomethylthio)-1,1'-sulfonyl-bis-ureas having the general formula:

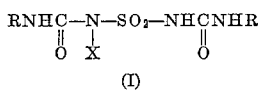

(I)

wherein R represents an aryl or substituted aryl group, and X represents a trihalomethylthio moiety.

In accordance with this invention, the bis-ureas I which possess biological activity are provided by the reaction of trihalomethylsulfenyl halides with selected N,N'-sulfonyl-bis-ureas under critical experimental conditions. The preparation of the bis-ureas thus is represented by the following equation wherein Y is a halogen atom:

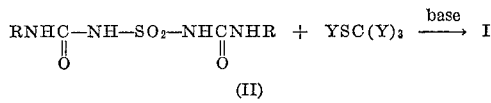

(II)

The N,N'-sulfonyl-bis-ureas II which are employed as intermediates in the practice of this invention are conveniently provided by the reaction of primary amines with sulfuryl diisocyanate. For instance, preparation of compounds of this nature has been disclosed by Onodera in Kogyo Kagaku Zasshi, 66(4), 481–84 (1963); C. A. 59, 13820 (1963), and a typical preparation of these compounds is illustrated in Example I hereinafter. Preferred embodiments of this invention are obtained when R in the intermediates II represents aryl having 6–10 carbon atoms, halogenated phenyl or nitrated phenyl. Illustrative of these preferred starting reactants are the N,N'-sulfonyl-bis-ureas prepared by the reaction of sulfuryl diisocyanate with aniline, 2-naphthylamine, o-, m- and p-chloroaniline, o-, m-, and p-bromoaniline, o-, m-, and p-fluoroaniline, o-, m-, and p-iodoaniline, 2,4-dichloroaniline, 2,4-dibromoaniline, 3,4-dichloroaniline, 3,4-dibromoaniline and o-, m-, and p-nitroaniline.

Any of the known trihalomethylsulfenyl halides may be reacted with the compounds II to provide bis-ureas included in the general Formula I. For instance, tribromomethylsulfenyl bromide, trifluoromethylsulfenyl chloride, and difluorochloromethylsulfenyl chloride may be employed in the process of this invention. However, preferred embodiments of this invention are obtained when trichloromethylsulfenyl chloride and dichlorofluoromethylsulfenyl chloride are used as reactants.

Procedures for reacting trihalomethylsulfenyl halides with compounds having a reactive acidic hydrogen atom are known and have been described in the literature as for example in U.S. Patent 2,553,770. However, when these procedures were employed in the reaction of the N,N'-sulfonyl-bis-ureas with the sulfenyl halides, the bis-ureas I could not be obtained and the starting materials were essentially recovered. It has now been found that the compounds I are provided when selected critical solvents are employed in their preparation, namely the N-lower alkyl (i.e., 1–4 carbon atoms) carboxylic amides, including for example dimethylformamide and dimethylacetamide.

Thus the process of this invention comprises reacting the bis-ureas II with trihalomethylsulfenyl halides in the aforementioned solvents and in the presence of a basic acid acceptor. A wide variety of suitable bases may be employed in this process, and any base which forms a salt by reaction with the acidic hydrogen atoms in II is suitably employed. For instance, the alkali metal and alkaline earth metal hydroxides, tertiary amines, metallic alkoxides and the like are conveniently utilized in the process described herein. The preparations are preferably carried out at a temperature range of less than 40° C. and even more preferably at 0°–25° C. A surprising and unexpected feature of this invention resides in the fact that even in the presence of stoichiometric excess of both acid acceptor and sulfenyl halide, only the mono(trihalomethylthio) derivatives are provided. This result is obtained even after extended reaction periods.

A preferred process embodiment of this invention is performed when the compounds II are first reacted with an alkali metal hydroxide to obtain the corresponding dialkali metal salts (i.e., Na, K, Cs, etc.) which are isolated prior to their reaction with the halides in the selected solvents. Higher yields of the bis-ureas I are provided when this procedure is employed.

It has been found that the bis-ureas I are quite effective in protecting a variety of plant species from harmful fungi. They are useful both as soil and foliar fungicides. For example, the substituted bis-ureas I are effective as broad spectrum foliar fungicides in controlling the early blight, rust and powdery mildew diseases which attack tomato, bean and cucumber plants respectively.

The following examples will serve to illustrate the preparation of the substituted bis-ureas I in accordance with this invention.

Example 1

The amount of 28.6 g. (0.2 mole) of 2-naphthylamine and 350 ml. of diethyl ether was charged into a 500 ml. flask fitted with addition funnel, magnetic stirrer and calcium chloride drying tube. The amine was only partially dissolved and formed therefore a thin slurry with the solvent. A solution of 9.4 ml. (0.1 mole) of sulfuryl diisocyanate in 100 ml. of ether was added dropwise over a period of one hour. The reaction was exothermic and finally a non-pourable thick paste was obtained. Additional ether was added to this paste in order to allow filtration. After filtration and drying, the amount of 42 g. (96%) of crude bis-urea was obtained. After slurrying the product in a 7:1 ether-dimethylformamide mixture, a white solid, M.P. 193° C. (dec.) was obtained. The following analytical data revealed that 1,1'-sulfonyl bis[3-(2'-naphthyl)urea] had been obtained.

*Analysis.*—Calcd. for $C_{22}H_{18}N_4O_4S$: C, 60.76; H, 4.17; N, 12.88; S, 7.37. Found: C, 60.90; H, 4.41; N, 12.57; S, 7.42.

Example 2

In a 125 ml. Erlenmeyer flask was placed 5.7 g. (0.015 mole) of 1,1'-sulfonyl-bis-(3-phenylurea) disodium salt and 45 ml. of dimethylformamide. The solution was cooled to 10° C. and 5.6 g. (0.03 mole) of trichloromethanesulfenyl chloride was added over a five minute period. The reaction mixture was poured over ice, then extracted with three 50 ml. portions of ether which were combined and extracted with two 20 ml. portions of water. The ether solution was dried over magnesium sulfate, filtered to remove inorganic salt and then evaporated to dryness. The residual solid was washed with benzene to give 6.0 g. of a solid product which was dissolved in a small amount of acetone and reprecipitated with a large excess of cyclohexane. The precipitate was filtered, washed with chloroform and dried to provide 5.7 g. (79%) of a crystalline material melting at 142–1460 C. (dec.). An infrared spectrum on this material showed C=O bands at 5.90μ and 6.05μ and $CCl_3$ bands at 12.2μ and 13.3μ. The following analytical data also confirmed that 1-trichloromethylthio-3,3'-diphenyl-1,1'-sulfonyldiurea had been obtained.

*Analysis.*—Calcd. for $C_{15}H_{13}Cl_3N_4O_4S_2$: C, 37.27; H, 2.69; Cl, 21.95; N, 11.59; S, 13.25. Found: C, 37.97; H, 3.06; Cl, 21.8; N, 11.73; S, 13.15.

*Example 3*

Using the procedure of Example 2, the amount of 4.34 g. of 1,1'-sulfonyl bis[3-(2'-naphthyl)urea] disodium salt dissolved in 30 ml. of dimethylformamide and 3.72 g. of trichloromethanesulfenyl chloride were allowed to react. The crude reaction product was dissolved in a small amount of acetone, cyclohexane was added to the cloud point and the solution was slowly evaporated until precipitation occurred. The precipitate was filtered, washed with chloroform, and dried to give 2.1 g. (42%) of a crystalline product. Melting point determination revealed decomposition between 140° to 155° C. The following analytical data indicated that 3,3'-(di-2-naphthyl)-1-trichloromethylthio-1,1'-sulfonyldiurea had been obtained.

*Analysis.*—Calcd. for $C_{23}H_{17}Cl_3N_4S_2O_4$: C, 47.34; H, 2.92; Cl, 18.18; N, 9.61; S, 10.98. Found: C, 48.23; H, 3.46; Cl, 17.9; N, 9.10; S, 10.76.

What is claimed is:

1. Substituted sulfonyl bis-ureas having the formula:

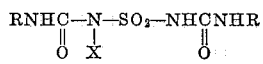

where each R represents aryl having 6–10 carbon atoms, halogenated phenyl or nitrated phenyl; and X represents a trichloromethylthio or dichlorofluoromethylthio moiety.

2. The compounds of claim 1 wherein R represents aryl having 6–10 carbon atoms and X is a trichloromethylthio moiety.

3. 1 - trichloromethylthio - 3,3' - diphenyl - 1,1' - sulfonyldiurea.

4. 3,3' - (di - 2 - naphthyl) - 1 - trichloromethylthio-1,1'-sulfonyldiurea.

5. A process for preparing mono-trihalomethylthio) substituted sulfonyl bis-ureas which comprises reacting (a) N,N'-sulfonyl-bis-ureas having the farmula

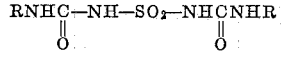

wherein R is aryl having 6–10 carbon atoms, halogenated phenyl or nitrated phenyl; with (b) a trihalomethylsulfenyl halide in an N-lower alkyl carboxylic amide solvent and in the presence of a basic acid acceptor.

6. The process of claim 5 wherein a reaction temperature range of about 0° C. to 40° C. is employed.

7. The process of claim 5 wherein dimethylformamide is employed as the solvent.

8. The process of claim 5 wherein dimethylacetamide is employed as the solvent.

9. A process for preparing mono(trihalomethylthio) substituted sulfonyl bis-ureas which comprises reacting (a) salts of N,N'-sulfonyl-bis-ureas having the formula

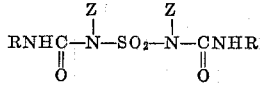

wherein R is aryl having 6–10 carbon atoms, halogenated phenyl or nitrated phenyl, and Z is an alkali metal; with (b) a trihalomethylsulfenyl halide in an N-lower alkyl carboxylic amide solvent.

No references cited.

CHARLES B. PARKER, *Primary Examiner.*

S. T. LAWRENCE, *Assistant Examiner.*